(12) United States Patent
Wilson et al.

(10) Patent No.: US 9,330,197 B2
(45) Date of Patent: May 3, 2016

(54) DATA ENVIRONMENT CHANGE NOTIFICATION

(75) Inventors: Richard M. Wilson, Charlotte, NC (US); Eric B. Stanley, Charlotte, NC (US); Benjamin Alexander Leeson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 685 days.

(21) Appl. No.: 12/413,122

(22) Filed: Mar. 27, 2009

(65) Prior Publication Data
US 2010/0145913 A1    Jun. 10, 2010

Related U.S. Application Data

(60) Provisional application No. 61/120,685, filed on Dec. 8, 2008, provisional application No. 61/120,621, filed on Dec. 8, 2008, provisional application No. 61/121,046, filed on Dec. 9, 2008.

(51) Int. Cl.
*G06F 17/30* (2006.01)
*G06F 9/54* (2006.01)
*G06Q 10/00* (2012.01)

(52) U.S. Cl.
CPC ......... *G06F 17/30908* (2013.01); *G06F 9/542* (2013.01); *G06F 17/30368* (2013.01); *G06Q 10/00* (2013.01)

(58) Field of Classification Search
CPC .................................................... G06F 17/30
USPC ........... 707/631, E17.005, E17.044, E17.014, 707/688, 706, E17.001, E17.032, 627, 628, 707/638; 709/202
See application file for complete search history.

(56) References Cited

U.S. PATENT DOCUMENTS

| 7,805,422 | B2 * | 9/2010 | Fang et al. | 707/702 |
| 2002/0107958 | A1 * | 8/2002 | Faraldo, II | 709/224 |

(Continued)

FOREIGN PATENT DOCUMENTS

EP    1 089 196 A3    7/2004

OTHER PUBLICATIONS

"Oracle Enterprise Manager 10g Change Management Pack" dated Oct. 2005; http://www.oracle.com/technology/products/oem/pdf/ds_change_pack.pdf.

(Continued)

*Primary Examiner* — Miranda Huang
(74) *Attorney, Agent, or Firm* — Michael A. Springs; Moore & Van Allen PLLC; Patrick B. Horne (57) ABSTRACT

A method of and system for monitoring and providing notification of changes to a data environment. Parameters of interest for monitoring changes made to a metadata data store are stored. Instructions are stored related to notifying a recipient of a communication about the changes. The metadata is monitored for changes related to the parameters of interest, and a change notification communication is generated with transmission initiated to the recipient. The instructions related to notification of the changes may include the identity of a recipient, mechanism for notification, and format and content of notification. A computer readable memory system and a computer program product may be provided that is encoded with a data structure for notifying data consumers of changes to a data environment that includes metadata.

25 Claims, 3 Drawing Sheets

(56) References Cited

U.S. PATENT DOCUMENTS

| | | |
|---|---|---|
| 2003/0046292 A1 | 3/2003 | Subramanian et al. |
| 2003/0126118 A1 | 7/2003 | Burton et al. |
| 2004/0078464 A1* | 4/2004 | Rajan et al. .................. 709/224 |
| 2004/0088332 A1* | 5/2004 | Lee et al. ..................... 707/200 |
| 2005/0165865 A1 | 7/2005 | Farmer |
| 2006/0123024 A1 | 6/2006 | Sathyanarayan et al. |
| 2006/0206532 A1* | 9/2006 | MacLaurin .................. 707/200 |
| 2007/0124340 A1* | 5/2007 | Chen et al. ................... 707/201 |

OTHER PUBLICATIONS

Woehrer, Alexander and Brezany, Peter, "Towards a Novel Metadata Information Service for Distributed Data Management", © 2007 Academy Publisher, Journal of Networks, vol. 2, Dec. 6, 2007; http://www.academypublisher.com/ois/index.php/inw/article/viewFile/02063341/695.

GB Search Report mailed Mar. 18, 2010 for GB Application No. GB0920474.4.

United Kingdom Examination Report dated Feb. 15, 2013 for Application No. GB0920474.4.

* cited by examiner

DATA ENVIRONMENT CHANGE NOTIFICATION

RELATED APPLICATIONS

This application claims the benefit of U.S. Patent Application No. 61/120,685, entitled "Data Environment Change Notification," filed Dec. 8, 2008, U.S. Patent Application No. 61/120,621, entitled "System and Method for Maintaining an Updated Information Inventory," filed Dec. 8, 2008, and U.S. Patent Application No. 61/121,046, entitled "Data Provisioning Registry," filed on Dec. 9, 2008, all sharing one or more common inventors herewith, and the entire contents of all of which are incorporated herein by reference.

BACKGROUND

Institutions may manage multiple data stores that include specific information about, for example, functions, products, applications, facilities, customers, or processes within the entity. The institutions may desire to identify centrally the location, structure and operating characteristics of these data stores in order to facilitate effective data management, governance, and retrieval.

A data store is a container in which digital information is gathered and/or maintained. The information in the data store may be structured or unstructured. A data store is not necessarily a Relational Database Management System (RDBMS), although this is one of the most common types of data store. It may take the form, for example, of a structured file system or hierarchical database. Moreover, a data store is not an application. Applications represent a use of information to fulfill a particular function. Many applications do maintain a set of data of concern only within the application's domain, but applications generally do not have a one-to-one relationship to individual data stores, especially in the case of shared information.

Large volumes of data make it practical to track descriptive information about the data and data stores, rather than collecting the data itself, and such descriptive data may be referred to as metadata. Metadata is data that provides information about other data. It is used to facilitate the understanding, use, and management of data by characterizing data resources and data sets to make them understandable, relevant, findable, and controlled. Metadata may be stored in a metadata repository data store. Current metadata management products may capture the current state of the metadata, but may not provide features to notify users of changes to the environment.

SUMMARY

In accordance with one embodiment, a method of monitoring and providing notification of changes to a data environment is provided. The method includes storing parameters of interest for monitoring of changes that are made to a selected first data store. The first data store includes metadata descriptive of data in a second data store. Instructions are stored related to notification of the changes, with the notification to be made to a recipient. The first data store is monitored for changes related to the parameters of interest, and creation of a communication to a recipient is initiated based on detected changes. A change notification communication is generated and transmission is initiated to the recipient. The instructions related to notification of the changes may include the identity of a recipient, mechanism for notification, and format and content of notification.

In accordance with another embodiment, an apparatus for monitoring and providing notification of changes to a data environment is provided. The system includes means for storing parameters of interest for monitoring of changes that are made to a selected first data store. The first data store includes metadata descriptive of data in a second data store. The system further includes means for storing instructions related to notification of the changes, with such notification to be made to a recipient, means for monitoring the first data store for changes related to the parameters of interest, means for initiating creation of communication to the recipient based on detected changes, and means for generating and initiating transmission of a change notification communication to the recipient. The instructions stored in the first data store related to notification of the changes may include the identity of a recipient, mechanism for notification, and format and content of notification.

In accordance with another embodiment, a computer readable memory system is provided that is encoded with a data structure for notifying data consumers of changes to a data environment including metadata descriptive of data in a second data environment. The data structure includes a data store with monitoring parameters, with such parameters being in or about the metadata identified to be of interest, and a data store with notification instructions, including the identity of a recipient of a notification, a mechanism of notification, and format and content of the notification. The monitoring parameters data store may also include a history of parameters of interest and may include a history of distributed notification communications.

In accordance with another embodiment, a computer program product is provided for notifying data consumers of changes to a first data environment, including metadata descriptive of data in a second data environment. The computer program includes instructions allowing entry of identified parameters of interest to be monitored in the first data environment, instructions for monitoring changes in the first data environment, instructions allowing entry of the identity of a recipient of a notification, a mechanism of notification, and format and content of the notification as relate to identified parameters of the first data environment, and instructions for creating a notification communication.

In accordance with another embodiment, an apparatus configured to notify data consumers of changes to a first data environment is provided. The first data environment includes metadata descriptive of data in a second data environment. The apparatus includes a computer readable storage medium, including computer readable program code stored therein, and a processor operatively coupled to the computer readable storage medium. The processor is configured to execute the computer readable program code to store parameters of interest for monitoring of changes that are made to the first data environment, store instructions related to notification of the changes, with such notification to be made to a recipient, and monitor the first data environment for changes related to the parameters of interest. The processor is further configured to initiate creation of communication to the recipient based on detected changes and generate and initiate transmission of a change notification communication to the recipient.

The features, functions, and advantages can be achieved independently in various embodiments of the present invention or may be combined in yet other embodiments.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description refers to the accompanying drawings, which illustrate specific embodiments. Other embodiments having different structures and operations do not depart from the scope of the claims appended hereto. It should also be understood that not every feature of the systems and methods described is necessary to implement the embodiments in any particular one of the appended claims. Throughout this disclosure, where a process or method is shown or described, the steps of the method may be performed in any order or simultaneously, unless it is clear from the context that one step depends on another being performed first. Also, time lags between steps can vary.

Figure 1:
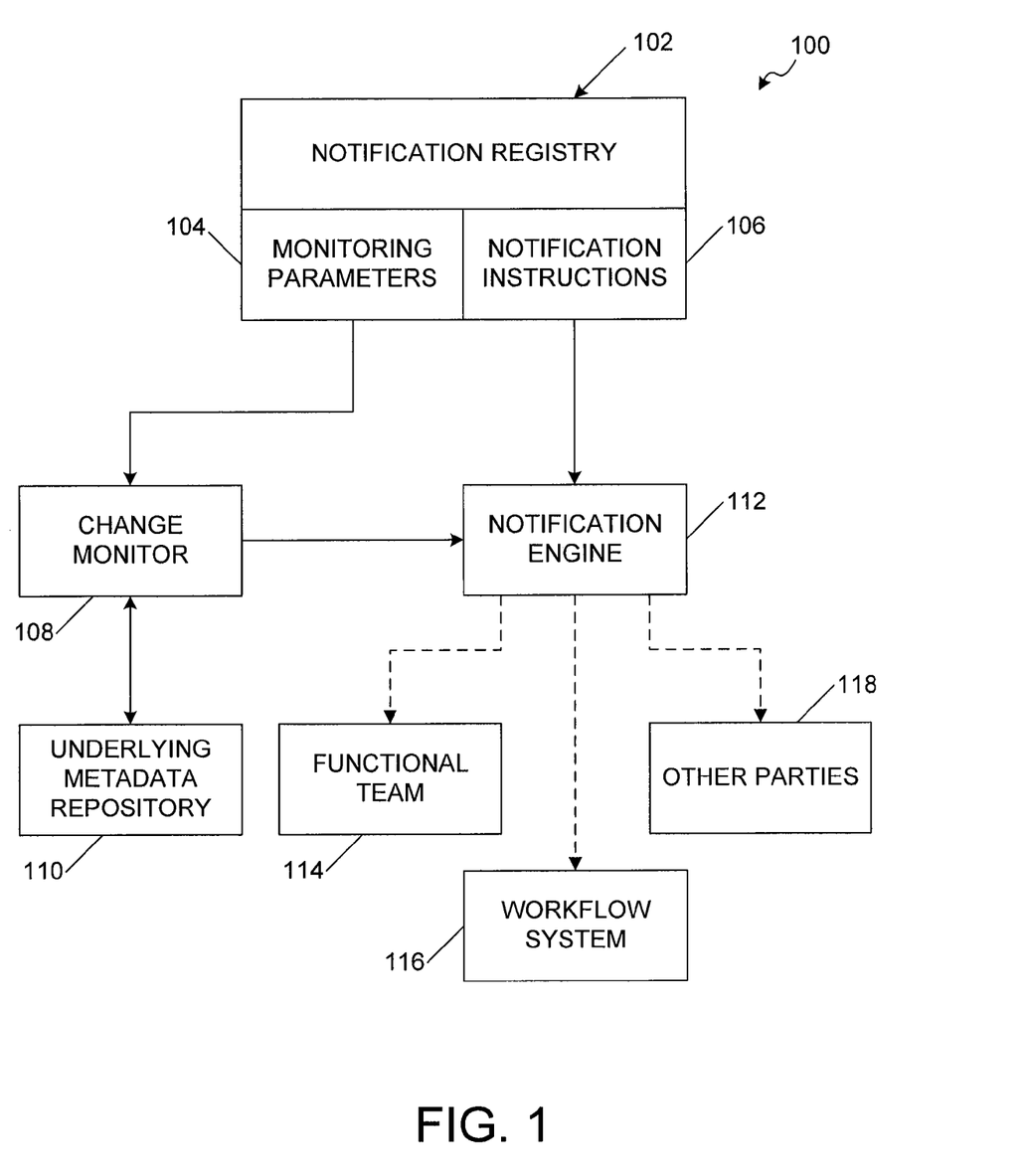
FIG. 1 is a flowchart that illustrates a method of monitoring changes in a data environment and notifying interested parties of such changes in accordance with an embodiment of the present invention.

Turning now to the drawings, FIG. 1 shows an embodiment of a data environment change notification system and method 100. A notification registry 102 includes a component data store related to monitoring interests 104 in metadata changes and a component data store related to notification instructions 106. Monitoring parameters 104 may include identified metadata elements of interest and the time frame, delay, change frequency, or operational scope (e.g. only data stores operating as part of a particular set of application systems, on a particular technical platform, geographical region or organizational unit) for which reporting is desired. Notification instructions 106 may include identified prospective recipients, the mechanism to be used for notification, and the format and content of the notification.

Continuous management of metadata, and in particular the gathering and updating of information on data stores, may result in a significant amount of data relating to the history, changes, and trends of the information environment. Data consumers, being users of or those otherwise interested in data, may find useful the ability to be notified of such history, changes, and trends according to instructions and preferences that the data consumer makes of record. The history may be helpful to support auditability of actions taken.

The monitoring parameters 104 are communicated to a change monitor 108. The change monitor 108 includes software that identifies changes to the metadata in an underlying metadata repository 110. The metadata repository 110 may store the history of technical, operational, and business metadata across platforms, projects, and organizations. Stored information may include levels of detail or aggregation such as (from broadest to most discrete) application system level, a data store level, table level, and field level.

Further description of an information management inventory is documented in commonly assigned U.S. patent application Ser. No. 12/413,116, entitled "Information Management Inventory," filed on concurrent date herewith, and U.S. patent application Ser. No. 12/413,125, entitled "Data Provisioning Registry" filed on concurrent date herewith, the entire contents of all of which are incorporated herein by reference.

The change monitor 108 transmits identified changes to the metadata in the metadata repository 110 to a notification engine 112, triggering communication to the interested parties based on the notification instructions 106. The notification engine 112 is responsible for message creation and distribution, and may use multiple communications formats such as email, programmatic Application Programming Interface, Messaging, and so forth. In addition, the notification engine 112 may be responsible for maintaining the auditability of its actions, i.e., it keeps track of its history by creating a an audit trail of what it has done, what it has told data consumers, and what messages have been sent. Notification messages may be sent to, for example, a functional team 114 of people in an organization for manual analysis and responsive action, a workflow system 116 for automated review and handling of the changes and any responsive action, or to other interested parties 118.

Figure 2:
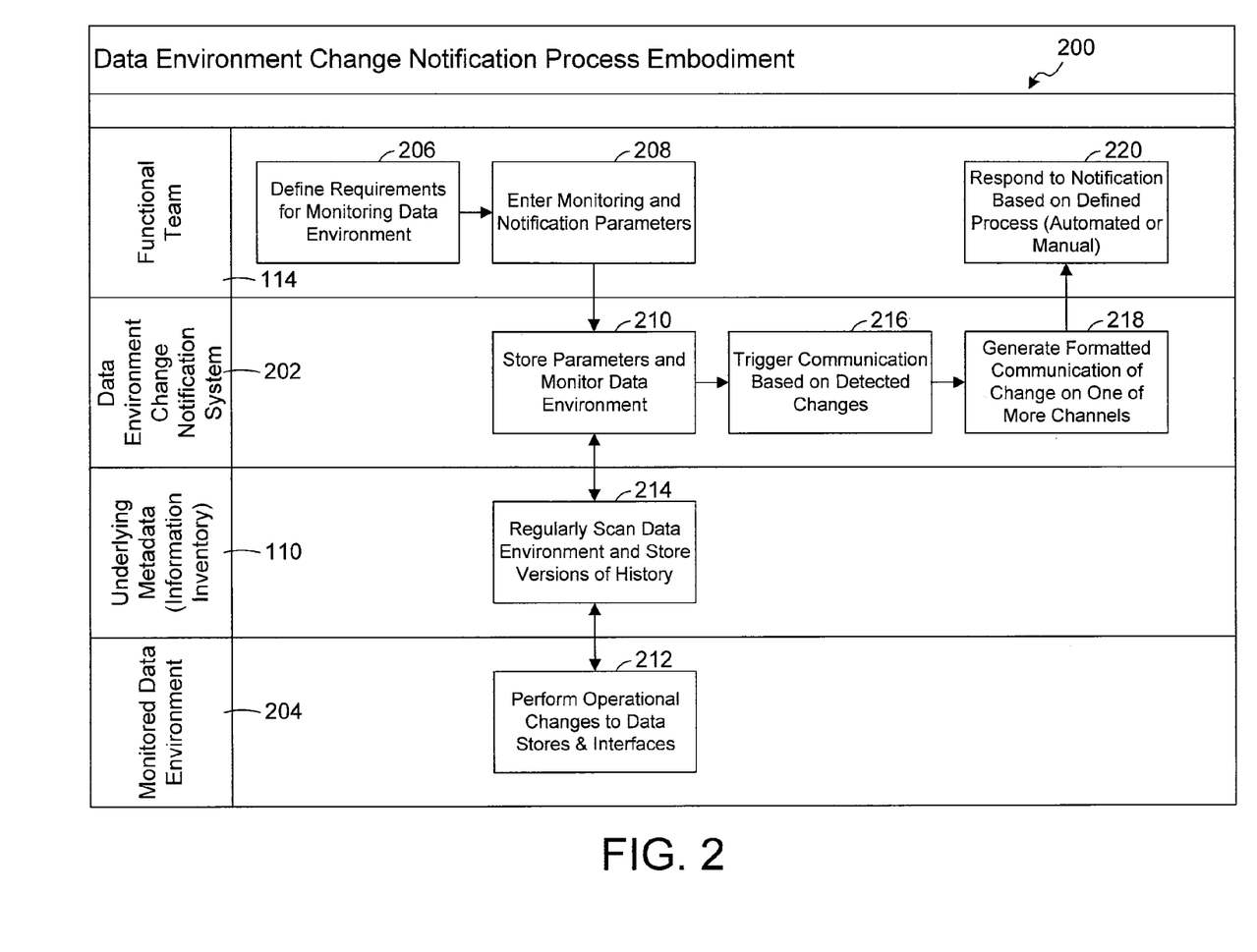
FIG. 2 is a cross-functional flowchart illustrating an embodiment of an implementation of the method of FIG. 1.

FIG. 2 shows an exemplary embodiment of implementation of a data change notification process and system 200. Acting in such an environment may be a functional team 114, a data environment change notification system 202, which may include a notification registry 102, change monitor 108, and notification engine 112, an underlying metadata repository/information inventory 110, and a monitored data environment 204. Initiating the implementation 200 may involve business or other analysts in the functional team 114 defining requirements for monitoring a data environment 206. Such requirements include monitoring and notification parameters in the change notification system 202, and these parameters are entered and then are stored, based on which the data environment is monitored 201.

In the monitored data environment 204 operational changes may be performed to the resident data stores and interfaces 212. Then the underlying metadata 110 is updated by regular scanning of the data environment 204 and versions of the history of the metadata are stored 214. Monitoring of the data environment 210 detects changes to the metadata, and such changes trigger communication to interested parties based on the detected changes. The change notification system 202 generates formatted communication of detected changes to monitored parameters on one or more communications channels 218, and the communication is sent to the functional team 114 or to an automated workflow system 116. The recipient of the notification may respond to the notification based on a defined manual or automated process 220 for handling of the information.

Figure 3:
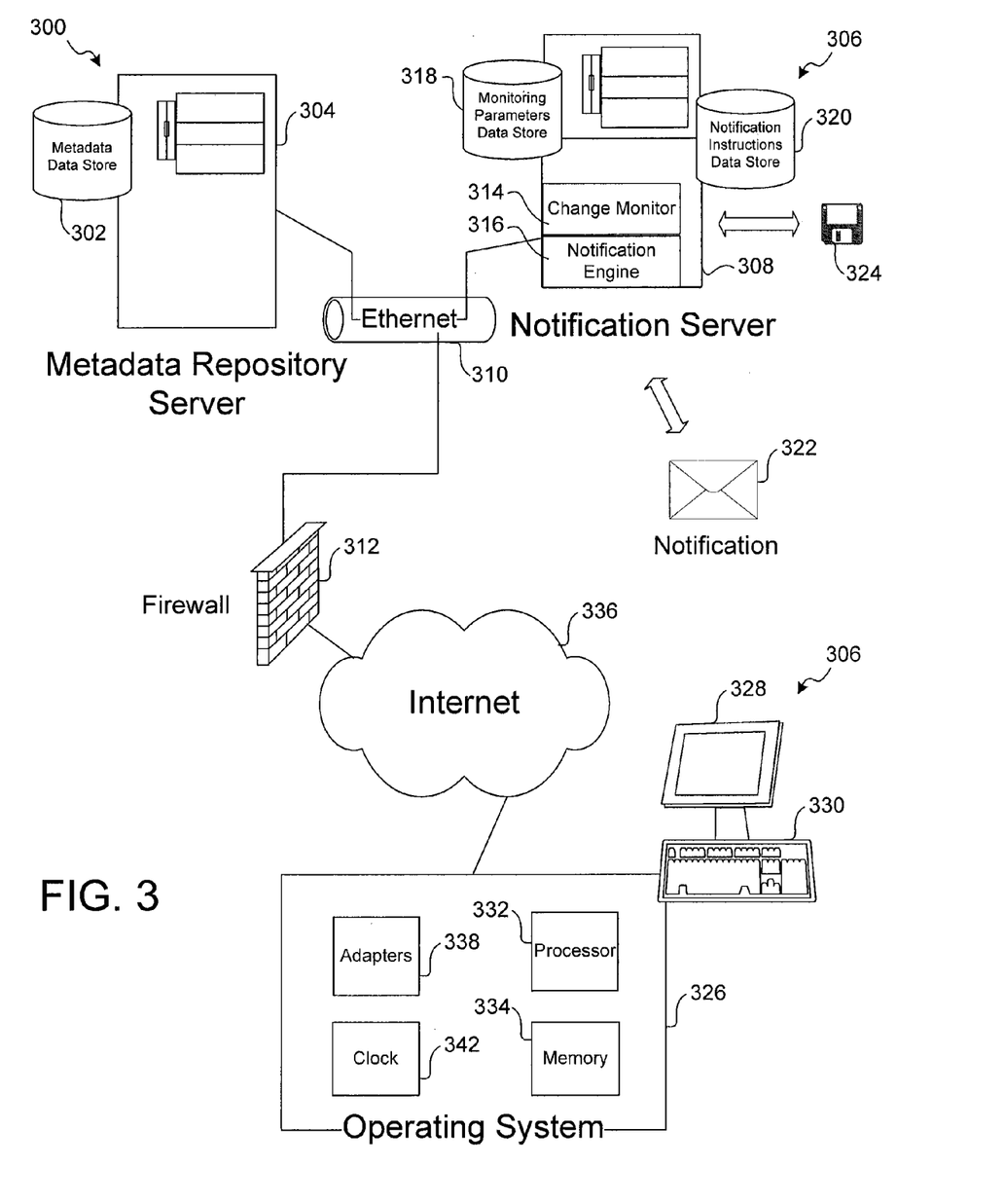
FIG. 3 is a system block diagram according to a sample embodiment of the present invention.

Turning to FIG. 3, a network block diagram showing the systems 300 involved in implementing an example embodiment is shown. An underlying metadata data store 302 resides on a metadata repository server 304. The institution also maintains change notification system 306 including notification server 308. The servers 304, 308 are connected via an Ethernet local area network (LAN) 310. As is the case with most businesses, these resources may be located behind an Internet firewall 312. The metadata repository server 304 and the notification server 308 are shown in this example as implemented on separate hardware platforms; however, they could just as easily be implemented on a single platform.

Still referring to FIG. 3, notification server 308 includes a change monitor 314 and a notification engine 316. The change monitor 314 includes a computer program to detect changes made to the metadata data store 302, and uses data from a monitoring parameters data store 318 for direction regarding what changes and time frame or frequency are of interest. The monitoring parameters data store 318 stores preferences and directions for data consumers who desire to be notified about a change to the metadata data store 302. The notification engine 316 includes a computer program that uses data from a notification instructions data store 320 for direction as to whom to direct communications, how to send the communications, and the format and content of the communications. The computer program of the notification engine generates and initiates transmission of notifications 322. The most readily contemplated form of notification would be an email message to a trusted email address of a recipient. In cases where an automated response in collaboration with other computer systems and human workflow is contemplated, the notification can take the form of a remote procedure call or other application programming interface (API) protocol as specified by available business process management (BPM) software. Examples of BPM software include Savvion BusinessManager by Savvion, Inc. of Santa Clara, Calif. and iFlow by Fujitsu Software Corporation of San Jose, Calif. Notifications could also be sent via an instant messaging service, to a wireless device via text messaging or short message service (SMS) or by setting up the system so an alert is presented via the World Wide Web when the recipient logs on from a different device. An automated telephone calling system with a recorded message could also be used. A notification could also be sent by having the system produce a printed communication to be delivered via mail. These scenarios are examples only, and many possible design choices can be made regarding how to implement the notification functionality disclosed herein, as well as all of the other functions described.

Computer program instructions to implement the various functions reside partly in memory of notification server 308 when it is in operation. When the system is not in operation, the instructions typically reside a fixed magnetic disk (not shown). The computer program instructions may also be stored on portable media such as a CD-ROM, tape cartridge, or removable magnetic disk, as conceptually illustrated by disc 324.

The software and hardware components of embodiments described herein can be implemented using a variety of combinations of system elements commonly used for software engineering and systems development. The main components of significance include the choice of a Database Management System (and an associated query language) housing the metadata data store as well as the notification registry, a software development and execution environment for the change monitor and notification engine, network protocols and connectivity for integration with other systems, and an underlying operating system and hardware platform for the system as a whole.

Typically, choices of these elements are guided by cost, connectivity, and scalability considerations as well as technical standards adopted by the development group or company in question. A set of complementary choices should be made to meet the technical requirements of the target environment. For example, some implementers may focus on minimal cost, and result in a platform based on inexpensive commodity-based Intel-based processors, a Linux operating system, a Java development environment, and Open Source software solutions for software development tools (e.g. Eclipse), database management systems and the like. Other implementers may opt to build any or all of the software components based on commercial software products provided by Microsoft Corporation as a way to achieve standards compliance or out-of-the-box interoperability. Large scale, high availability, or high performance solutions may require more specialized components, matched to support more stringent business and system requirements.

In any case, a computer program which implements all or parts of the embodiments described herein through the use of systems like those illustrated in FIG. 3 can take the form of a computer program product, including executable code, residing on a computer usable or computer readable storage medium. Such a computer program can be an entire application to perform all of the tasks necessary to carry out the embodiments described herein, or it can be a macro or plug-in which works with an existing general purpose application such as a spreadsheet or database program. A tangible medium may be used, but note, however, that the "medium" may also be a stream of information being retrieved when a processing platform or execution system downloads the computer program instructions through the Internet or any other type of network. Computer program instructions which implement the embodiments described herein can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network.

A functional team's computer system 326 of FIG. 3 is represented by a conceptual block diagram. Such a client system is typically connected to peripherals such as display 328 and keyboard 330. The processing platform includes one or more processors 332, and a certain amount of memory 334. The functional team's computer system accesses the institution's servers via the Internet 336, or alternatively a secure LAN, wide area network (WAN), or other network internal to the institution. Information can be gathered on installed adapters 338, the operating system 326, and characteristics of the system clock 342.

The flowcharts and block diagrams in the figures illustrate the architecture, functionality, and operation of possible implementations of systems, methods and computer program products according to various embodiments described herein. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting. As used herein, the singular forms "a", "an" and "the" are intended to include the plural forms as well, unless the context clearly indicates otherwise. Additionally, comparative, quantitative terms such as "above", "below", "less", "greater", are intended to encompass the concept of equality, thus, "less" can mean not only "less" in the strictest mathematical sense, but also, "less than or equal to."

A data environment change notification system and method according to the embodiments described herein may allow users of a metadata repository to receive notification of changes to the structure, lineage, and other characteristics of data stores in a structured data environment, based on registering a request to monitor for those changes. Although specific embodiments have been illustrated and described herein, those of ordinary skill in the art appreciate that any arrangement which is calculated to achieve the same purpose may be substituted for the specific embodiments shown and that there are other applications in other environments and adaptations or variations. The following claims are in no way intended to limit the scope of the appended claims to the specific embodiments described herein.

What is claimed is:

1. A method of monitoring and providing notification of changes to a data environment, using a notification server, the method comprising:

storing, on the notification server in a monitoring parameters data store, parameters of interest for monitoring of changes that are made to at least one selected metadata data store, the at least one metadata data store including metadata corresponding to data in at least one local server;
wherein the parameters of interest comprise delay, change frequency and operational scope for which reporting is desired; and
wherein operational scope relates to whether the selected at least one metadata data store is operating as part of a predetermined set of application systems, on a predetermined technical platform, in a predetermined geographical region or as part of a predetermined organizational unit;

storing, on the notification server in a notification instructions data store, instructions related to notification of the changes;

monitoring, using a change monitor executed by the notification server and based on the parameters of interest, the at least one metadata data store for changes;

initiating creation of a change notification communication, using a notification engine executed by the notification server, to a recipient based on the instructions related to notification of the changes, in response to one or more changes detected in the metadata data store, the change notification communication comprising information indicating that one or more changes has been detected in the metadata data store;

communicating, using the notification engine executed by the notification server, the change notification communication to the recipient, the notification communication comprising a notification instruction;

in response to detecting one or more changes in the metadata data store, communicating a remote procedure call using an application programming interface (API) protocol to an automated workflow system for responding to the one or more changes based on a defined automated process; and determining whether the one or more changes detected in the metadata store matches one or more changes with corresponding one or more automated actions stored in a notification instructions data store;

in response to determining that the one or more changes in the metadata data store matches the one or more changes with corresponding one or more automated actions, initiating a remote procedure call from the notification instructions data store to execute the one or more corresponding automated actions in the metadata data store; and maintaining auditability of notification engine actions and communications to data consumers and communications to a workflow system for automated review of the changes and responsive action, the maintaining comprising:
tracking and storing, using the notification engine, a history of change notification communications comprising a history of change notification communication creations and distributions; and
storing a plurality of versions of the history of the metadata.

2. The method of claim 1, wherein the instructions related to notification of the changes comprise an identity of the recipient, a mechanism for notification, a format and a content of notification.

3. The method of claim 2, wherein the instructions related to notification of the changes comprise an identity of the recipient, the identity indicating the recipient is human or automated.

4. The method of claim 1, wherein monitoring, using a change monitor executed by the notification server, the metadata data store comprises querying the metadata data store.

5. The method of claim 1, further comprising storing, on the notification server, versions of the history of change notification of the metadata data store.

6. The method of claim 1, further comprising receiving, by the notification server, monitoring parameters and notification instructions, wherein monitoring parameters are received in the monitoring parameters data store and notification instructions are received in the notification instructions data store.

7. The method of claim 1, further comprising receiving, by a functional team of an organization or an automated workflow system, the change notification communication and taking action in response to the change notification communication.

8. A notification server for monitoring and providing notification of changes to a data environment, the notification server comprising a processor configured for:

storing, on the notification server in a monitoring parameters data store, parameters of interest for monitoring of changes that are made to at least one selected metadata data store, the at least one selected metadata data store including metadata descriptive of data in at least one local server;
wherein the parameters of interest comprise delay, change frequency and operational scope for which reporting is desired; and
wherein operational scope relates to whether the selected at least one metadata data store is operating as part of a predetermined set of application systems, on a predetermined technical platform, in a predetermined geographical region or as part of a predetermined organizational unit;

storing, on the notification server in a notification instructions data store, instructions related to notification of the changes;

monitoring, using a change monitor and based on the parameters of interest, the at least one metadata data store for changes;

initiating creation of a change notification communication to a recipient, in response to one or more changes detected in the metadata data store, wherein the change notification communication comprises information indicating that one or more changes has been detected in the metadata data store;

communicating, using a notification engine, the change notification communication to the recipient, the notification communication comprising a notification instruction;

in response to detecting one or more changes in the metadata data store, communicating a remote procedure call using an application programming interface (API) protocol to an automated workflow system for responding to the one or more changes based on a defined automated process;

determining whether the one or more changes detected in the metadata store matches one or more changes with corresponding one or more automated actions stored in a notification instructions data store;

in response to determining that the one or more changes in the metadata data store matches the one or more changes with corresponding one or more automated actions, initiating a remote procedure call from the notification instructions data store to execute the one or more corresponding automated actions in the metadata data store; and maintaining auditability of notification engine actions and communications to data consumers and communications to a workflow system for automated review of the changes and responsive action, the maintaining comprising:

tracking and storing, using the notification engine, a history of change notification communications comprising a history of change notification communication creations and distributions; and storing a plurality of versions of the history of the metadata.

9. The notification server of claim 8, wherein the instructions related to the notification of changes comprise an identity of the recipient, a mechanism for notification, a format and a content of notification.

10. The notification server of claim 9, wherein the instructions related to notification of the changes comprise an identity of the recipient, the identity indicating the recipient is human or automated.

11. The notification server of claim 8, wherein monitoring the metadata data store, using the notification server, comprises querying the metadata data store.

12. The notification server of claim 11, wherein the processor is further configured for storing, on the notification server, versions of the history of the change notification of the metadata data store.

13. The notification server of claim 8, wherein the processor is further configured for entering, on the notification server, monitoring parameters and notification instructions, wherein monitoring parameters are entered in the monitoring parameters data store and notification instructions are entered in the notification instructions data store.

14. The notification server of claim 8, wherein the processor is further configured for tracking and storing, using the notification engine, the history of change notification communications comprising a history of change notification communication creations and distributions, wherein:

the history of creations comprises change notification communication format and change notification communication content, the history of distributions comprises change notification communication recipients comprising functional teams, workflow systems, and interested parties, and the history of distributions comprises change notification communication channels of communication.

15. A computer program product for notifying data consumers of changes to a first data environment, the first data environment including metadata descriptive of data in a second data environment, the computer program product including a computer readable non-transitory storage medium encoded with a non-transitory data structure having a computer program stored therein, the computer program comprising:

instructions for allowing entry of identified parameters of interest to be monitored in the first data environment;

instructions for monitoring changes in the first data environment;

instructions for allowing entry of the identity of a recipient of a notification, a mechanism of notification, and format and content of the notification as relate to the identified parameters of the first data environment;

instructions for creating a notification communication, in response to one or more changes detected in the first data environment, wherein the change notification communication comprises information indicating that one or more changes related to at least one identified parameter has been detected in first data environment, the notification communication comprising a notification instruction;

instructions for, in response to detecting one or more changes in the metadata data store, communicating a remote procedure call using an application programming interface (API) protocol to an automated workflow system for responding to the one or more changes based on a defined automated process;

instructions for determining whether the one or more changes detected in the metadata store matches one or more changes with corresponding one or more automated actions stored in a notification instructions data store;

in response to determining that the one or more changes in the metadata data store matches the one or more changes with corresponding one or more automated actions, initiating a remote procedure call from the notification instructions data store to execute the one or more corresponding automated actions in the metadata data store; and instructions for maintaining auditability of notification engine actions and communications to data consumers and communications to a workflow system for automated review of the changes and responsive action, the instructions for maintaining comprising:

instructions for tracking and storing a history of change notification communications comprising a history of change notification communication creations and distributions; and instructions for storing a plurality of versions of the history of the metadata.

16. The computer program product of claim 15, wherein instructions for monitoring changes in the first data environment comprise instructions for querying the first data store.

17. The computer program product of claim 16, further comprising instructions for storing versions of the history of change notification of the first data store.

18. The computer program product of claim 15, further comprising instructions for tracking and storing the history of change notification communication creations and distributions, wherein:

the history of creations comprises change notification communication format and change notification communication content, the history of distributions comprises change notification communication recipients comprising functional teams, workflow systems, and interested parties, and the history of distributions comprises change notification communication channels of communication.

19. The computer program product of claim 15, further comprising instructions for initiating transmission of a notification communication to the recipient.

20. A notification server configured to notify data consumers of changes to a metadata data store, the metadata data store including metadata descriptive of data in a second data environment, the notification server comprising:

a computer readable storage medium encoded with a data structure including computer readable program code stored therein;

a processor operatively coupled to the computer readable storage medium and configured to execute the computer readable program code to:

store, on the notification server in the monitoring parameters data store, parameters of interest for monitoring of changes that are made to the metadata data store, and wherein the metadata data store is located within a metadata repository server;

store, on the notification server in the notification instructions data store, instructions related to notification of the changes;

monitor, using a change monitor, the metadata data store for changes related to the parameters of interest;

initiate creation of a change notification communication to the recipient, in response to one or more changes detected in the metadata data store, wherein the change notification communication comprising information indicating that one or more changes has been detected in the metadata data store;

communicate, using a notification engine, the change notification communication to the recipient, the notification communication comprising a notification instruction;

in response to detecting one or more changes in the metadata data store, communicating a remote procedure call using an application programming interface (API) protocol to an automated workflow system for responding to the one or more changes based on a defined automated process;

determining whether the one or more changes detected in the metadata store matches one or more changes with corresponding one or more automated actions stored in a notification instructions data store;

in response to determining that the one or more changes in the metadata data store matches the one or more changes with corresponding one or more automated actions, initiating a remote procedure call from the notification instructions data store to execute the one or more corresponding automated actions in the metadata data store; and maintain auditability of notification engine actions and communications to data consumers and communications to a workflow system for automated review of the changes and responsive action, the maintaining comprising:

tracking and storing, using the notification engine, a history of change notification communications comprising a history of change notification communication creations and distributions; and storing a plurality of versions of the history of the metadata.

21. The notification server of claim 20, wherein the instructions related to notification of the changes comprise the identity of a recipient, mechanism for notification, and format and content of notification.

22. The notification server of claim 20, wherein the processor being configured to execute the computer readable program code to monitor the metadata data store, using the notification server, comprises querying the metadata data store.

23. The notification server of claim 22, wherein the processor is further configured to execute the computer readable program code to store, on the notification server, versions of the history of change notification of the first data environment.

24. The method of claim 1, wherein tracking and storing comprises:

tracking and storing, using the notification engine, the history of change notification communications comprising a history of change notification communication creations and distributions, wherein:

the history of creations comprises change notification communication format and change notification communication content, the history of distributions comprises change notification communication recipients comprising functional teams, workflow systems, and interested parties, and the history of distributions comprises change notification communication channels of communication.

25. The notification server of claim 20, wherein the processor is configured to execute the computer readable program code to track and store, using the notification engine, a history of change notification communications comprising a history of change notification communication creations and distributions, wherein:

the history of creations comprises change notification communication format and change notification communication content, the history of distributions comprises change notification communication recipients comprising functional teams, workflow systems, and interested parties, and the history of distributions comprises change notification communication channels of communication.

* * * * *